United States Patent [19]
Hansen

[11] Patent Number: 6,049,572
[45] Date of Patent: Apr. 11, 2000

[54] OPTIMIZATION OF QAM CONSTELLATION SPACE FOR AUXILIARY I-Q SIGNALING

[75] Inventor: Carl Christian Hansen, Aloha, Oreg.

[73] Assignee: Intel Corporation, Santa Clara, Calif.

[21] Appl. No.: 08/774,393

[22] Filed: Dec. 30, 1996

[51] Int. Cl.[7] ................................... H04L 27/36
[52] U.S. Cl. ............................ 375/298; 375/295
[58] Field of Search ....................... 375/261, 269, 375/279, 280, 308, 298, 260, 295; 370/522, 527, 508, 207

[56] References Cited

U.S. PATENT DOCUMENTS

| | | | |
|---|---|---|---|
| 5,105,443 | 4/1992 | Betts et al. | 375/265 |
| 5,237,292 | 8/1993 | Chethik | 375/261 |
| 5,440,585 | 8/1995 | Partridge, III | 375/261 |
| 5,515,400 | 5/1996 | Arai | 375/261 |
| 5,521,942 | 5/1996 | Betts et al. | 375/295 |
| 5,524,025 | 6/1996 | Lawrence et al. | 375/260 |
| 5,559,791 | 9/1996 | Bremer et al. | 370/207 |
| 5,661,718 | 8/1997 | Bremer et al. | 370/207 |

*Primary Examiner*—Chi H. Pham
*Assistant Examiner*—Emmanuel Bayard
*Attorney, Agent, or Firm*—Blakely, Sokoloff, Taylor & Zafman LLP

[57] ABSTRACT

A digital modulator is disclosed for handling primary and auxiliary frames of binary information as part of a two channel communication system. The modulator includes a primary frame-to-vector mapper for generating primary symbol vectors in accordance with quadrature amplitude and phase shift keying (QAM), and an auxiliary frame-to-vector mapper for generating auxiliary vectors in the In-Phase and Quadrature (I-Q) signal space. For those auxiliary vectors having endpoints lying within a given first area, the endpoints are mapped into a second area that represents an optimum auxiliary signal content given a primary symbol constellation in the I-Q plane. A mapped auxiliary vector is then added to an associated primary symbol vector. A carrier is then modulated in accordance with the sum vector.

17 Claims, 8 Drawing Sheets

OPTIMIZATION OF QAM CONSTELLATION SPACE FOR AUXILIARY I-Q SIGNALING

BACKGROUND

This invention relates to the general field of digital communication systems, and more specifically to modulation and demodulation systems such as modems that employ quadrature amplitude and phase shift keying.

Designers of modern digital communication systems typically employ a modulation technique known as amplitude and phase shift keying, also referred to as quadrature amplitude modulation (QAM). When used in modern modulator/demodulator (modem) devices that employ the V.34 protocol recommended by the International Telecommunication Union for communication between computers, the QAM technique yields improved bit rate for a given signal to noise ratio. The transmission/reception rate capabilities of these modern systems are routinely pushed to their limits when asked to transmit and receive large amounts of data that may include digitized text, graphics, and sound. In addition, the desire to operate at low power levels calls for designers to squeeze as much information as possible into a given signal without increasing its power.

In order to appreciate how this invention improves a digital communication system, a brief review of some basic communication concepts is presented. Turning now to FIG. 1, a prior art technique for preparing information at a transmitter to be sent to a communication channel is shown. First, information such as video or audio is often initially in analog format, such that a conversion into digital form is required in order to be transmitted by a digital communication system. This is accomplished in the A/D conversion block 103 in FIG. 1.

Next, the information will often be encoded into another digital format, as done in waveform coder 105. For example, when audio such as speech is digitized by an A/D conversion block 103, the resulting bit stream typically flows at 64 Kbits/second. This bit rate is due to sampling and quantization requirements for maintaining an acceptable level of fidelity between the original analog signal and the digitized version. Such a bit rate may, however, be too high for error free transmission over a channel such as an analog telephone line. Hence, what is known as a waveform coder will be typically used to encode the 64 Kbit/sec. stream into 8 Kbit/sec by taking advantage of certain special characteristics of speech. In so doing, waveform coder 105 often will create packets of information from the steady stream of digital information it received from the A/D conversion block 103. Thus, the output of waveform coder 105 may be a series of frames where each frame consists of n bits, such that one of $2^n$ different frames can be transmitted at a time.

The output of waveform coder 105 can typically be characterized as two signals: a primary signal 109 and an auxiliary signal 111. Each one is in the form of a series of frames as described above. A significant portion of the audio data is contained in a given primary frame, while a less significant portion lies in an associated auxiliary frame. Such a separation between primary and auxiliary signals is a result of one of many well-known waveform coding schemes used for encoding audio data. In one case, a primary frame may consist of 4 bits such that $2^4=16$ different primary frames can be generated by waveform coder 105. An associated auxiliary frame would consist of perhaps 2 bits representing one of 4 different auxiliary frames.

Once encoded into primary and auxiliary signals 109 and 111, the binary information is again processed to be superimposed on a carrier waveform for transmission along a communication channel. This process is called modulation. Modulation in the purest sense is defined as the alteration of the carrier in order to cause it to convey information. For example, the characteristics of a simple carrier can be expressed in the form of a sinusoid $A \sin(\omega t+\phi)$, where A is amplitude, $\omega$ is radian frequency, and $\phi$ is phase. Thus, a carrier can be modulated in amplitude, frequency, or phase. Digital modulation, which is used in this invention, refers to the use of a limited set of discrete values of A, $\omega$, and $\phi$ consistent with the binary nature of the information to be transmitted.

The term quadrature amplitude modulation (QAM) is used to describe the combining of two amplitude and phase modulated carriers in quadrature. Quadrature refers to a phase difference of 90° between the two carriers. One of these carriers is known as the In Phase carrier and the other as the Quadrature carrier. For example, one can be a digitally modulated sine wave, while the other is a digitally modulated cosine wave of the same frequency.

In FIG. 1, auxiliary frame-to-vector mapper 113 for the auxiliary signal, and primary frame-to-vector mapper 115 for the primary signal are shown following the coder 105 as part of a QAM modulator 110. Operation of these two mappers can be best understood by referring to FIG. 2. FIG. 2 is a signal space diagram containing a constellation depicted by the 16 primary symbol points, used to represent the output of a frame-to-vector mapper. The 2-dimensional space is called the In phase and Quadrature (I-Q) plane 221, where a vector drawn from the origin and ending in a point on the signal space represents the modulation to be performed on the quadrature carriers. Points along the horizontal axis represents all possible modulations to a single cosine carrier, whereas points along the vertical axis represent all possible modulations to a single sine carrier. Points in the plane therefore require a combination of a sine and a cosine carriers.

In the exemplary I-Q plane 221, primary symbol point 223 at the endpoint of primary vector 227 is one of 16 different primary symbol points lying on the constellation in the I-Q plane. These primary symbol points identify the modulation to be applied on a carrier by QAM modulator 110 for each of 16 different primary frames 109 of binary information generated by waveform coder 105 in FIG. 1. In a similar fashion, auxiliary vector 229, associated with primary vector 227, represents the modulation to be applied for an associated auxiliary frame 111 generated by the waveform coder 105.

Returning to FIG. 1, in a typical prior art QAM modulation system, the output of the auxiliary frame-to-vector mapper 113 (represented by auxiliary vector 229 in FIG. 2) may need to be amplitude limited by a clipper 107 to avoid introducing detection errors at the receiver. Any auxiliary vector 229 having an amplitude larger than a, where 2* a is the horizontal and vertical distance between two neighboring primary symbol points in the constellation, is redefined as having amplitude a. This can be seen in FIG. 2 where auxiliary vector 229 is drawn beginning at the end point of the primary vector 227 and lies within a disk of radius a.

After the auxiliary and primary vectors have been computed by mappers 113 and 115, respectively, the two vectors are added to form sum modulation vector 231 in FIG. 2. Due to clipper 107 limiting the amplitude of auxiliary vector 229, the endpoint of sum modulation vector 231 will always lie in a disk of radius a centered at the primary symbol point 223. Lastly, the carrier waveform will be modulated in accordance with the sum modulation vector 231 in carrier modulation block 108 and sent across the communication channel.

The significance of the disk having radius a can be appreciated by considering a communication system that supports only a single channel, i.e., a QAM modulator that accepts only primary frames 109. FIG. 3 illustrates a signal space diagram showing an I-Q plane 321 and the symbols received in such a single channel system before being passed to a conventional QAM demodulator. The actual received symbols over a given period of time appear as a cloud formation 341 around each primary symbol point 323. The cloud 341 appears to have a more or less circular shape because of the random nature of noise that was added to the primary vector 327 after modulation at the transmitter. In a noise free environment, detected vectors would have occurred precisely on the constellation, i.e., the designated 16 primary symbol points in FIG. 3. In actuality, however, a small noise vector 329 is added to the primary symbol vector 327 after modulation at the transmitter and before demodulation at the receiver. This results in the formation of the error clouds are around each primary symbol point at the receiver.

It can be seen that most of the contents of error cloud 341 lies within a disk 343 of radius a with center at the primary symbol point 323. If a received symbol point 325 falls inside the disk area around a primary symbol point 323, then the demodulator can safely assume that the received signal consists of the primary symbol 323 represented by primary vector 327, and an additional noise vector 329.

Analogous to this approach, the prior art transmitter of FIG. 1 adds an auxiliary vector 111 to an associated primary vector 109 in order to use the error cloud region to transmit auxiliary information in a second communication channel. The error cloud region is also referred to as a conventional disk of area $\pi a^2$. Although the technique of using a conventional disk to support a second channel of communication may be a convenient solution to the problem of transmitting primary and auxiliary information generated by a waveform coder, the performance of a dual channel communication system can be improved by making a more efficient use of the area in the I-Q plane surrounding each primary symbol point.

SUMMARY

This invention is directed at a QAM modulator that supports two channels of information, one in a primary signal and another in an auxiliary signal. The system provides an improvement over the prior art in either signal to noise ratio or bit rate.

The modulator features an auxiliary frame-to-vector (F-V) mapper for generating an auxiliary vector in response to receiving an auxiliary frame of binary information. The auxiliary vector defines an endpoint in the two dimensional I-Q signal space. The system also includes a point-to-point (P-P) mapper for mapping points within a first area into points within a second area. The P-P mapper is for transforming the endpoint of an auxiliary vector, the endpoint lying within a given first area, into a mapped point within the given second area. The mapped point thus defines a mapped auxiliary vector. To complete the system, a primary F-V mapper generates a primary symbol vector in the I-Q signal space in response to receiving a primary frame of binary information. The modulator then adds a primary vector to a mapped auxiliary vector, generating a sum modulation vector. A carrier is then modulated in accordance with the sum vector.

In its preferred embodiment, this invention presents an improvement over the conventional disk used in the prior art by using the entire square area around each primary symbol point to contain the auxiliary channel. This improves signal to noise ratio by allowing increased auxiliary signal power for a given primary symbol bit rate. Alternatively, the primary symbol bit rate is increased by permitting a denser primary symbol constellation (smaller separation 2*a between primary symbol points) for an equal auxiliary signal power.

DRAWINGS

These and other features, aspects, and advantages of this invention will be better understood with regard to the following description, appended claims, and accompanying drawing where:

DETAILED DESCRIPTION

With reference to the figures, exemplary embodiments of the invention will now be described. The exemplary embodiments are primarily described with reference to flowcharts, block diagrams and circuit schematics. As the flowcharts, each block within the flowcharts represents both a method step and an apparatus element for performing the method step. Herein, the apparatus element may be referred to as a means for, an element for, or a unit for performing the method step. Depending upon the implementation, the apparatus element, or portions thereof, may be configured in hardware, software, firmware or combinations thereof.

Figure 4:
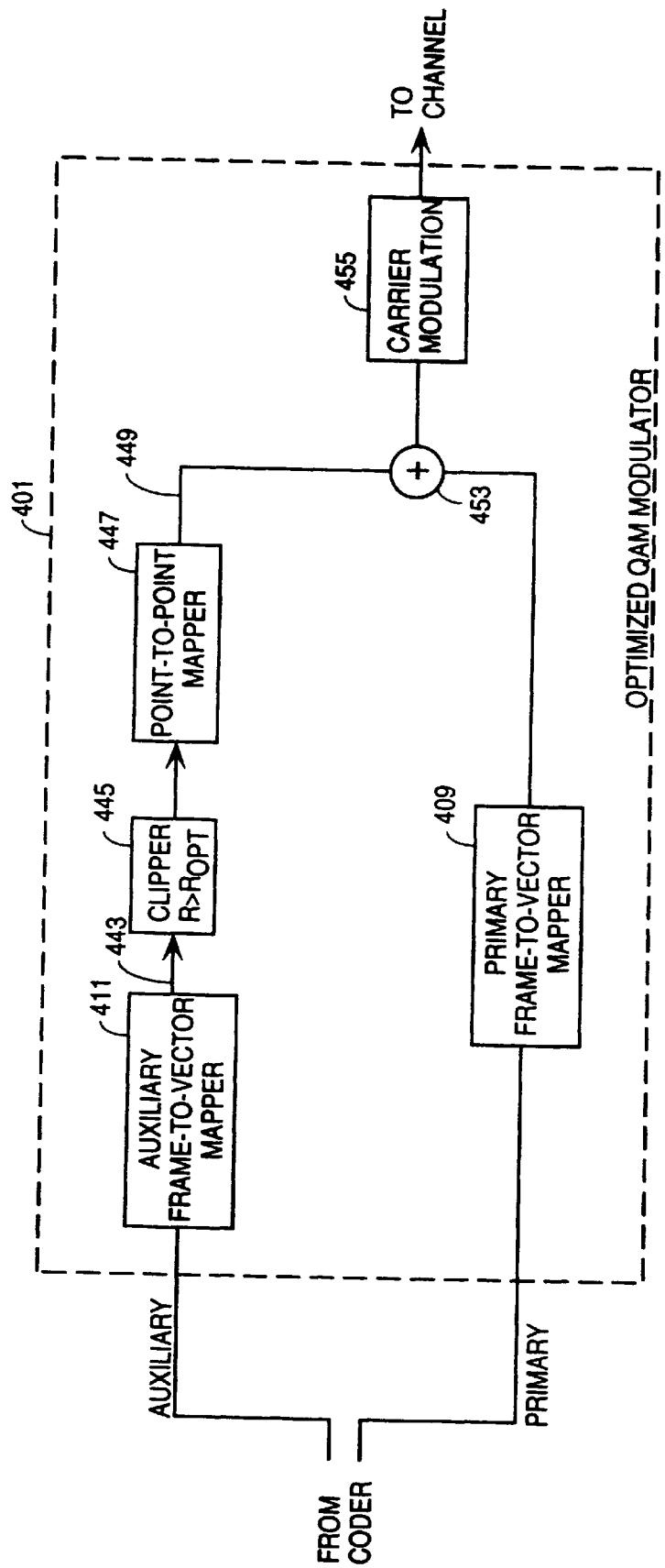
FIG. 4 is an embodiment of a modulator according to this invention.

FIG. 4 illustrates an embodiment of the optimized QAM modulator 401 of this invention. The modulator 401 typically operates in response to a primary and an auxiliary signal received from a coder, also discussed above with respect to the prior art in FIG. 1. A primary frame is usually associated with an auxiliary frame to create a pair of frames representing two communication channels. Each primary frame of information is handled by primary F-V mapper 409 in accordance with known techniques in the art. An auxiliary frame of binary information is received by auxiliary F-V mapper 411. In one embodiment, the auxiliary portion of modulator 401 includes the trio auxiliary F-V mapper 411, clipper 445, and P-P mapper 447, where each auxiliary frame generated by the coder is processed by the trio. Typically, all of the functional blocks in FIG. 4 will be implemented in software, however, a hardware modification to one or more of the blocks may also be made.

Figure 1:
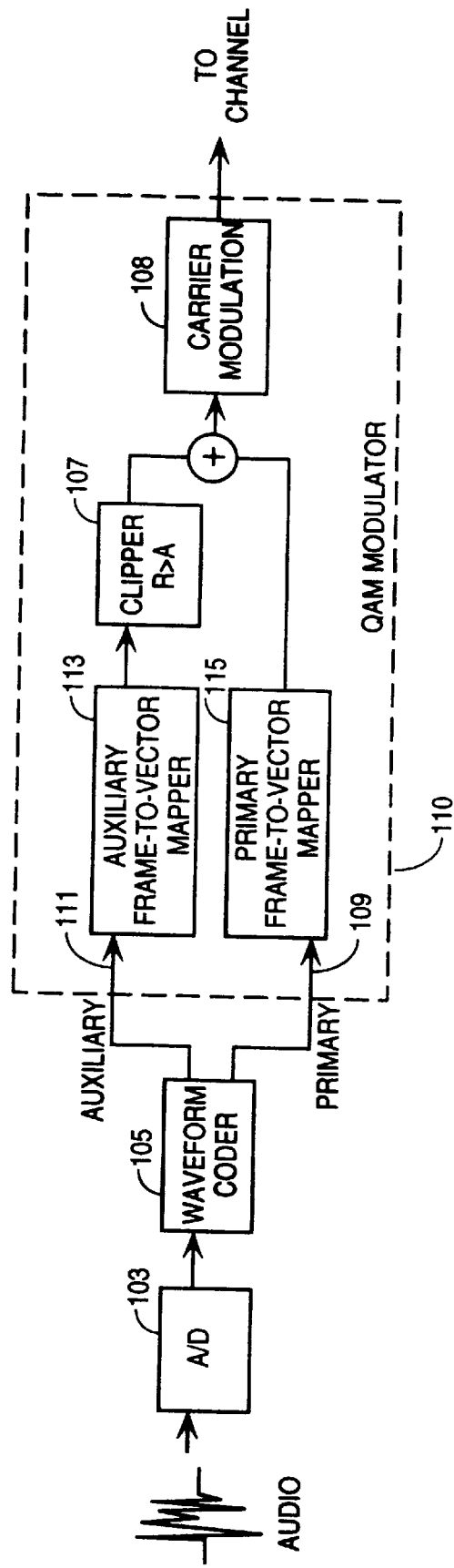
FIG. 1 shows a portion of a prior art transmitter.
Figure 2:
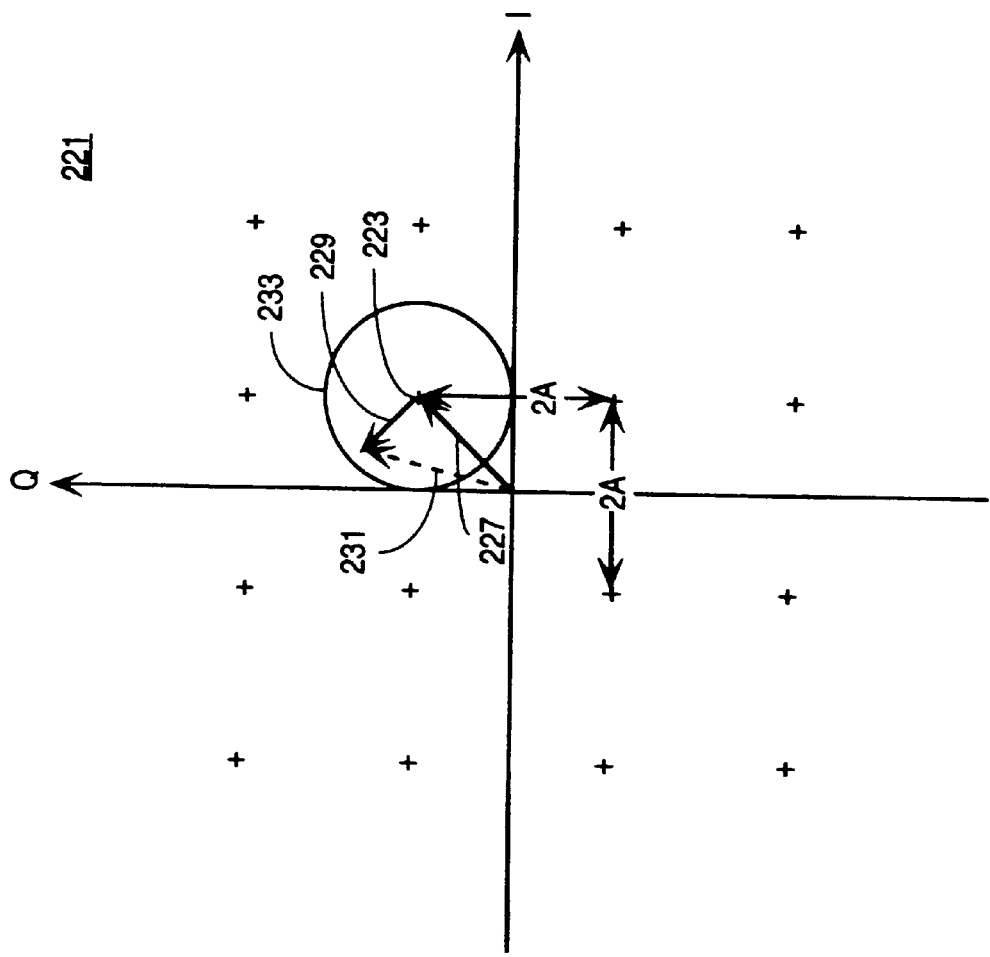
FIG. 2 illustrates a 16-point constellation in the I-Q signal space.

In a preferred embodiment, auxiliary F-V mapper 411 operates the same as auxiliary F-V mapper 113 of FIG. 1 in transforming an auxiliary frame of binary information into an auxiliary vector 443. In the embodiment shown in FIG. 4, auxiliary vector 443 will lie in the I-Q signal space which also includes primary vectors generated by primary F-V mapper 409 in response to primary frames of binary information received from the coder. Auxiliary vector 443 is then fed to clipper 445 which limits the amplitude of each auxiliary vector to $R_{opt}$, the radius of an optimum disk area. The system, however, will also work with a logarithmic compressor instead of clipper 445. In the absence of clipper 445, any auxiliary vectors 443 which have an amplitude larger than $R_{opt}$ are not discarded but instead can be compressed in a scaler fashion so as to lie somewhere inside the disk. This latter step can be implemented inside either auxiliary F-V mapper 411 or P-P mapper 447. Similarly, if implemented, the clipper 445 can actually be a part of auxiliary modulator 411 in accordance with known techniques. Alternatively, the clipper 445 can be a simple line of program code as part of P-P mapper 447.

Next, P-P mapper 447 performs a point-to-point mapping of the endpoint defined by the auxiliary vector (either after being clipped by clipper 445, or scaled logarithmically), resulting in a mapped auxiliary vector 449. Finally, using vector adder 453, the mapped auxiliary vector 449 is added to an associated primary vector to yield a sum modulation vector. A carrier modulated in accordance with the sum vector, based on QAM, is then created by carrier modulation block 455 and transmitted into the communication channel. The above sequence of operations is repeated for each pair of primary and auxiliary frames received by mappers 409 and 401, respectively, so as to maintain auxiliary and primary channel frame synchronization.

Figure 3:
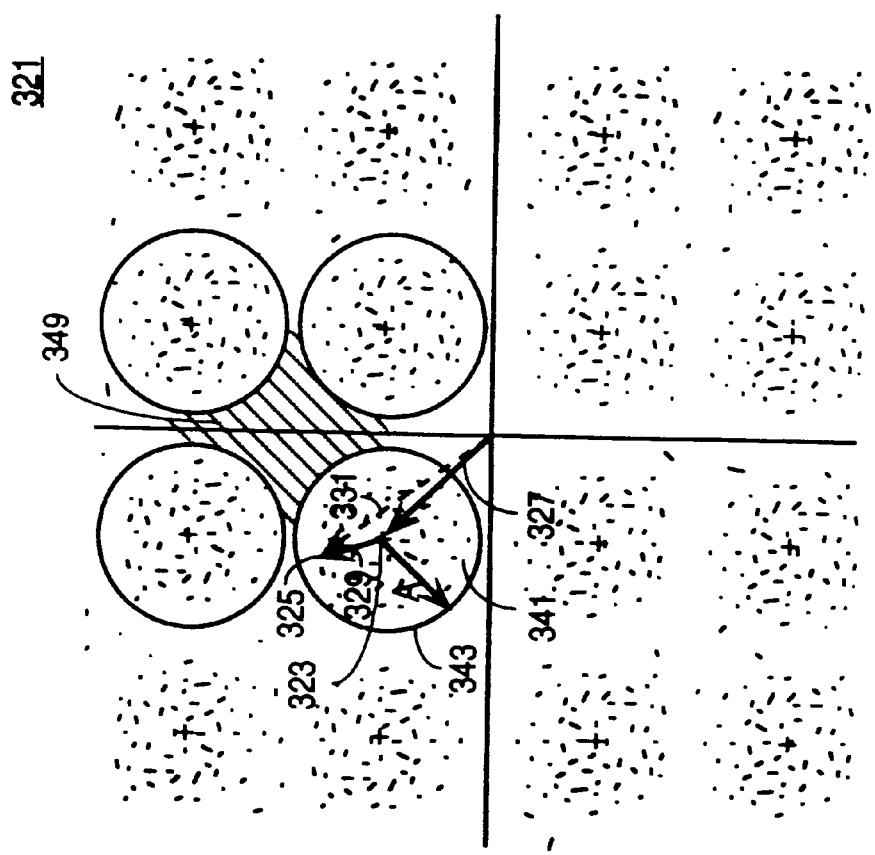
FIG. 3 is an I-Q signal space showing prior art usage of the area surrounding primary symbol point.
Figure 5A:
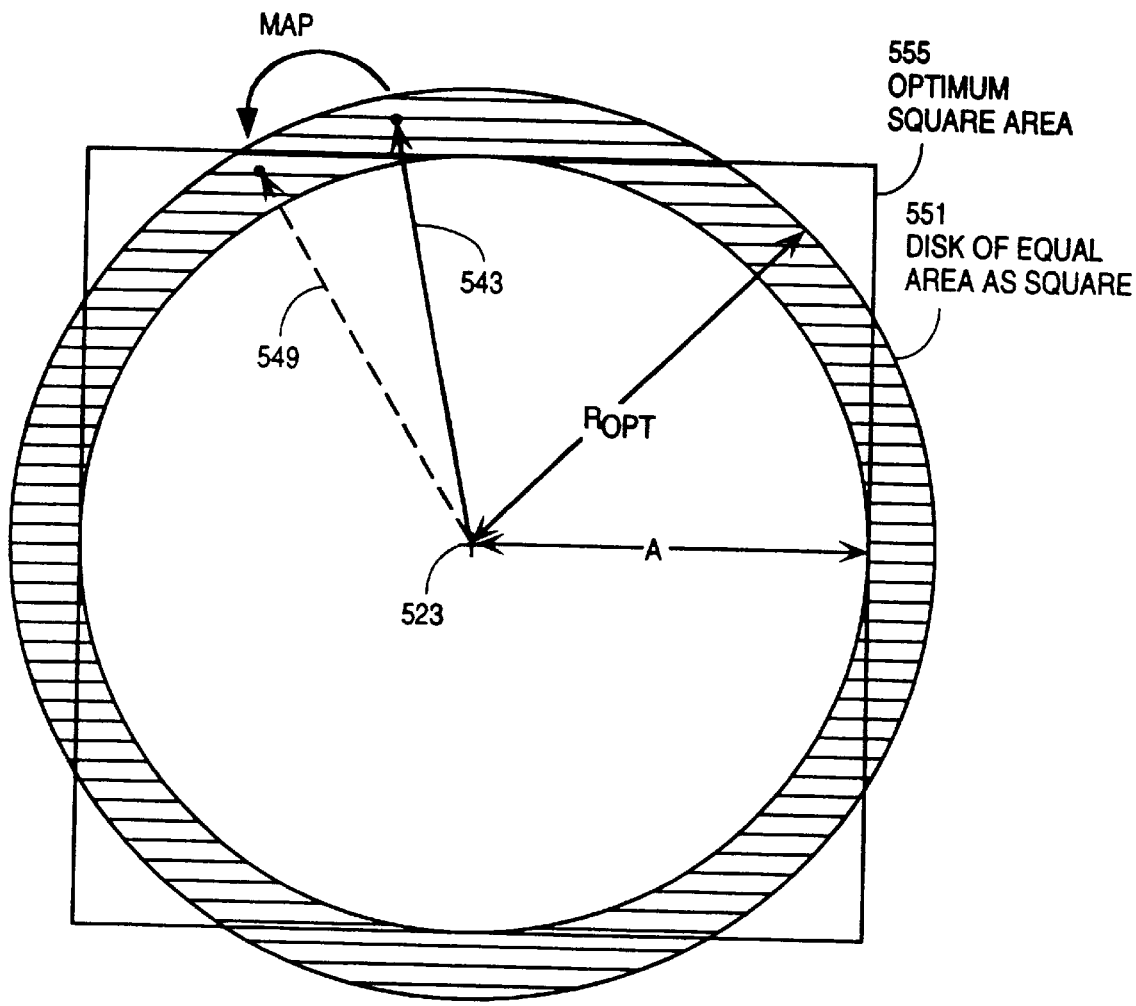
FIG. 5A shows the disk and square areas surrounding a primary symbol point.

A graphical representation of the preferred function of P-P mapper 447 is shown in FIG. 5A. FIG. 5A is a scale drawing of the area around a primary symbol point in the I-Q signal space. Endpoint 523 of a primary symbol vector appears at the center of the figure. A square 555 having sides of length 2*a is drawn to represent the maximum available area in which an auxiliary vector can be placed relative to an associated primary symbol point given a primary symbol spacing 2*a for the constellation of FIG. 3. FIG. 5A also shows an optimum disk 551 having the same area as the square 555 and a radius $$R_{opt} = \frac{2}{\sqrt{\pi}} a.$$

The latter equation was obtained by setting the area of the optimum square 555 equal to the area of a circle having a radius $R_{opt}$, and then solving for $R_{opt}$.

An exemplary auxiliary vector 543, created by auxiliary F-V mapper 411 in FIG. 4, is shown lying within the disk 551 as placed relative to an associated primary symbol point and ending outside the square 555. The endpoint of auxiliary vector 543 is then mapped into a mapped auxiliary point inside the square 555 by P-P mapper 447. A mapped auxiliary vector 549 is thus defined. By mapping all points within the disk 551 into the optimum square 555, the optimum amount of auxiliary information may be sent together with an associated primary symbol, for a given primary symbol point spacing of 2*a.

The difference in information carrying capacity between the QAM modulator of this invention and the prior art can be appreciated by considering the relative areas of the optimum disk 551 and the conventional disk of area $\pi a^2$. In FIG. 5A, the improvement in information carrying capacity is represented by the shaded annular region. The ratio of the optimum disk 551 area to the conventional disk area is $4/\pi=1.27$. Thus, the modulation system of this invention can support an auxiliary signal power of approximately 1.27 times the auxiliary signal power allowed by a conventional modulator for the same primary symbol bit rate.

Alternatively, the modulation system of this invention allows an increase in the primary symbol bit rate while at the same time maintaining the same auxiliary signal to noise ratio at the receiver. As explained above, the transmitted bit rate is represented by the spacing 2*a between the primary symbol points on the I-Q plane of FIG. 3 such that as 2*a decreases, the bit rate increases. This is because as the spacing is reduced, the constellation of primary symbol points becomes denser for a given area in the I-Q signal space and hence a larger number of bits are needed to represent each transmitted frame of primary information. The improvement in bit rate can be understood by considering two I-Q signal spaces, a first signal space containing N different symbols arranged in a grid similar to FIG. 3 having a minimum separation 2*a and a conventional disk area for the auxiliary vectors of $\pi a^2$. Next, consider a second signal space having P different symbols, where P is a number larger than N, and where the P different symbols have a minimum separation of 2*b where b is less than a. Using the modulation system of this invention for the second signal space, the optimum square area will have sides of length 2*b and an area $4b^2$. If the square area of the second signal space is then set equal to the conventional disk area of the first signal space, viz. $4b^2=\pi a^2$ such that the auxiliary signal power (represented by the areas) in both signal spaces remains the same, then $$b = \frac{\sqrt{\pi}}{2} a = 0.886 * a.$$

This reduction in the spacing between the primary symbol points of the second signal space results in an increased primary bit rate for the same auxiliary signal power available in the first signal space when using the conventional disk.

Figure 5B:
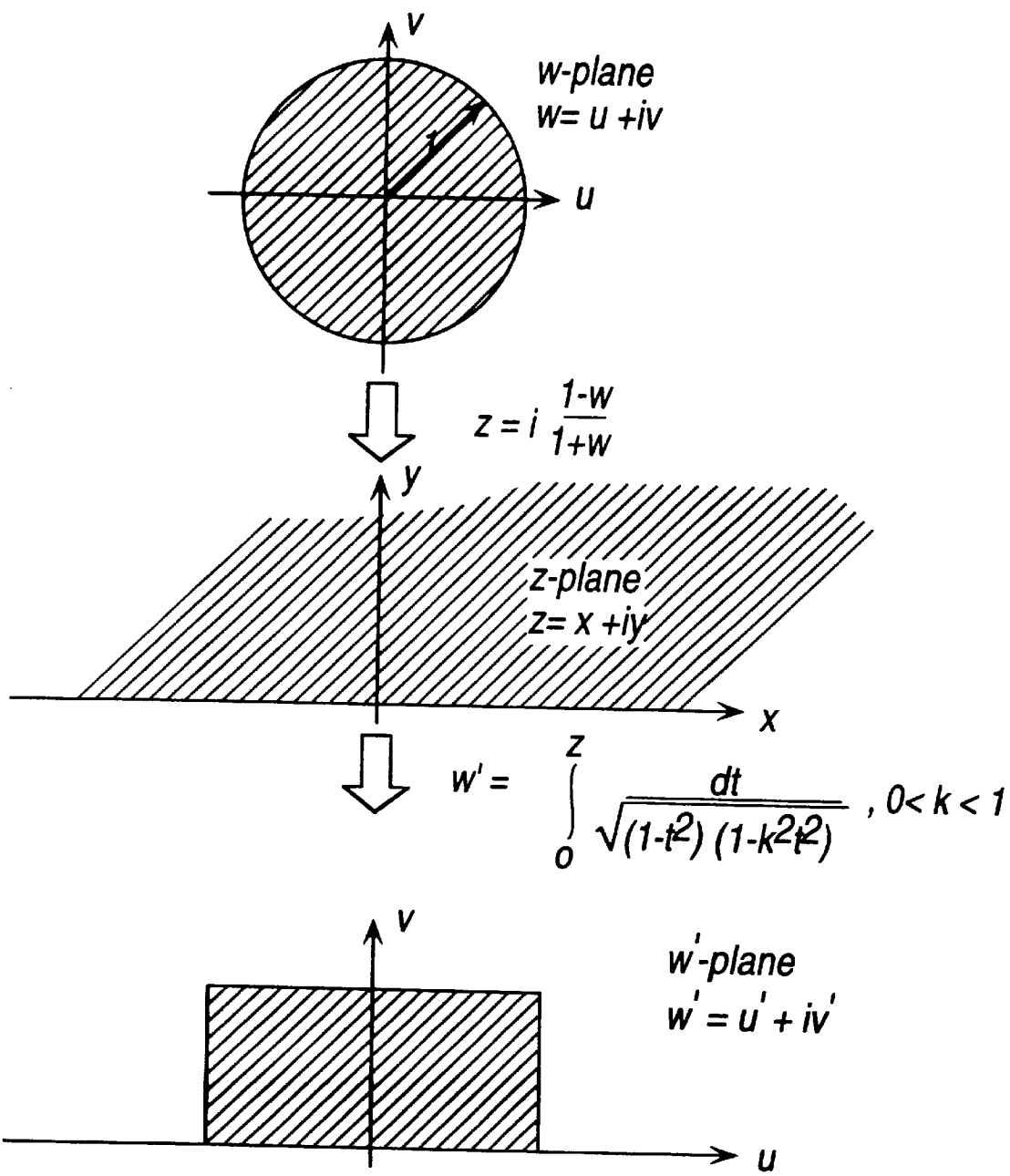
FIG. 5B is an examplary disk to square transformation for the mapping function.

As discussed earlier, the auxiliary F-V mapper 411 and primary F-V mapper 409 of FIG. 4 may be implemented in accordance with known techniques in the art. Clipper 445 may also be readily implemented in software. The same also holds for vector adder 453. P-P mapper 447 may be implemented in software or hardware, such that it provides a one to one mapping of an auxiliary endpoint into a mapped auxiliary endpoint according to a mapping function F. In one embodiment, the function F may be implemented using known conformal mapping and complex variable techniques, such as those discussed in the text *Conformal Mapping*, Zeev Nehari, New York, McGraw-Hill (1952). An exemplary combination of transformations for achieving the function F is shown in FIG. 5B. The transformations from the w-plane to the z-plane to the w'-plane can be implemented using well-known numerical techniques.

In another embodiment, mapping function F may be implemented using piecewise approximation techniques where the optimum disk 551 is partitioned into smaller sections. Each such section can be assigned a different mapping function so as to only fill the portions of square area 555 that extend beyond the optimum disk 551.

In still another embodiment, the mapping function F will be implemented using a look-up table. The table lists a number of points lying inside the disk 551 and corresponding to mapped points (computed or approximated according to function F) that lie inside the square area 555.

Figure 6:
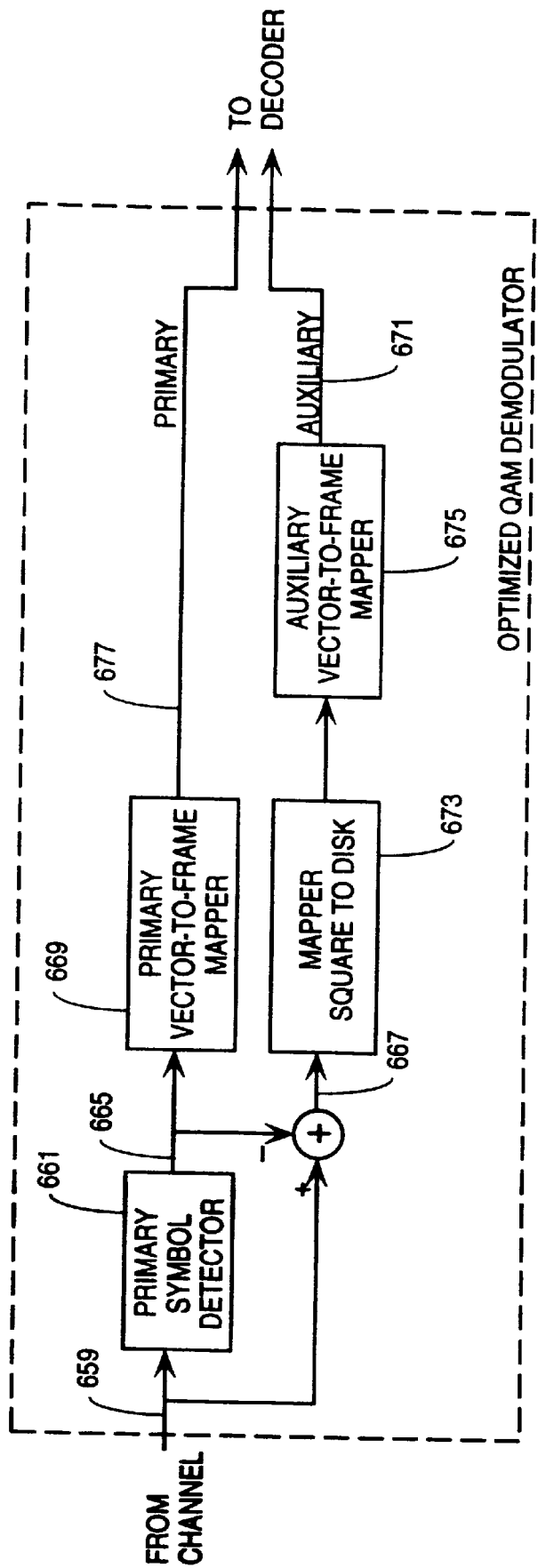
FIG. 6 is an embodiment of a demodulator in accordance with this invention.

Although this invention has been described primarily in terms of a modulation system at the transmitter, the above principles are also used in implementing a novel demodulator at the receiver. FIG. 6 shows such an embodiment where a received symbol vector 659 arrives at a primary symbol detector 661. Primary symbol detector 661 determines which primary symbol the received vector 659 corresponds to by determining which optimum square area (having sides of length 2*a) contains the received endpoint. When the primary vector 665 has been so detected, it is subtracted from the received vector 659 to result in a received auxiliary vector 667. The received primary vector 665 is then input to the primary vector-to-frame (V-F) mapper 669 which transforms vector 665 into a frame of received primary data 677 in accordance with known techniques. The received auxiliary vector 667, on the other hand, is handled by square-to-disk (S-D) mapper 673 before being transformed by a conventional auxiliary V-F mapper 675. S-D mapper 673 performs the reverse operation of P-P mapper 447 of the modulation system of FIG. 4 and the disk-to-square mapping of FIG. 5B. Auxiliary V-F mapper 675 then performs a well-known transformation from an auxiliary vector in the I-Q signal space into an auxiliary frame of binary information 671. Once the primary 677 and auxiliary 671 frames of received data have been obtained, they are forwarded to a decoder unit which then reconstructs the binary bit stream originally appearing at the receiver.

Figure 7:
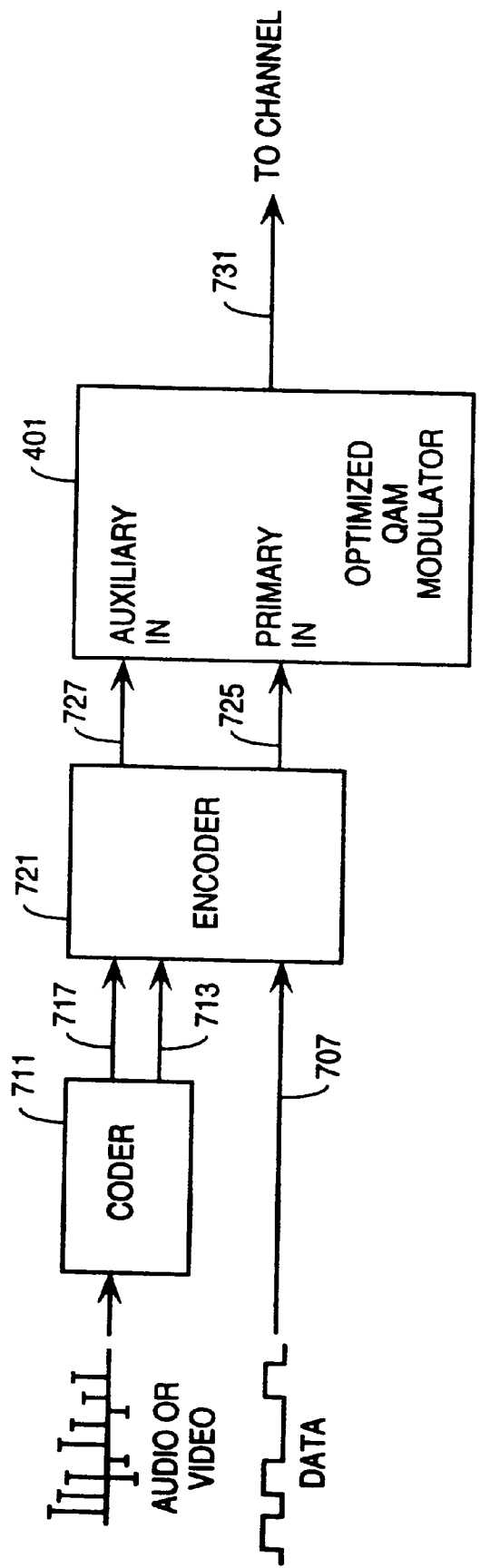
FIG. 7 is a portion of a multi-media transmitter including a modulator of this invention.

For the preferred embodiment of this invention, a portion of a transmitter system is shown in FIG. 7 wherein the source of raw binary information includes multimedia information such as audio, video, and data. A coder 711 is typically added for the treatment of high rate bit streams such as audio or video. Such coders may generate two signals 713 and 717. An exemplary type of waveform coder is the linear predictive coder (LPC) used to analyze a raw digital audio waveform of sound and speech. The LPC typically generates a number of primary parameters known as LPC coefficients that will appear as primary coder frame 713. Using the LPC coefficients, short and long term signals, may be extracted from the audio information, leaving an auxiliary coder frame 717.

In encoder block 721, the coder signals 713 and 717 may be then combined with other data 707, which may include graphics and text, to form a primary frame 725. Typically, the auxiliary coder frame 717 will be recast by encoding block 721 as an auxiliary frame 727 which will then be the auxiliary input to an optimized auxiliary modulator 401. The primary coder frame 713 from coder 711 will be combined with other data 707 as a primary frame 725. The primary frame 725 becomes the primary input to optimized QAM modulator 401. In response to these auxiliary and primary inputs, modulator 401 generates a primary vector, and adds it to a generated auxiliary vector. The sum vector is then used to modulate the carriers 731 in accordance with QAM which are then sent to the communication channel.

The embodiments of the modulation system described above for exemplary purposes are, of course, subject to other variations in software and hardware within the capabilities of one reasonably skilled in the art. Indeed, the details above are intended merely to illustrate principles of the invention and should not be construed as limiting the scope of the invention.

What is claimed is:

1. A digital modulator comprising:
    primary frame-to-vector (F-V) mapper for generating one of a plurality of primary symbol vectors in an In phase and Quadrature (I-Q) signal space in response to a received primary frame of binary information, the primary F-V mapper utilizing a quadrature amplitude and phase shift keying modulation technique;
    auxiliary F-V mapper for generating an auxiliary vector in response to a received auxiliary frame of binary information, the auxiliary vector defining an endpoint in the I-Q signal space;
    point-to-point (P-P) mapper coupled to the auxiliary F-V mapper, for mapping points within a first area of the signal space into points within a second area of the signal space, the P-P mapper for transforming the endpoint within the first area into a mapped point within the second area, the mapped point defining a mapped auxiliary vector; and
    a vector adder coupled to the primary F-V mapper and to the P-P mapper, for generating a sum modulation vector by adding the primary symbol vector to the mapped auxiliary vector.

2. The digital modulator of claim 1 wherein the first area is defined by a disk and the second area is defined by a square.

3. The digital modulator of claim 2 wherein
    the plurality of primary symbol vectors define a plurality of equally spaced primary symbol points in a grid fashion in the I-Q signal space, a distance between two neighboring primary symbol points defined as 2*a.

4. The digital modulator of claim 3 wherein the disk and the square area are centered at a primary symbol point in the I-Q signal space.

5. The digital modulator of claim 3 wherein the disk has a radius $$\frac{2}{\sqrt{\pi}}a,$$

and the square area has sides of length 2*a.

6. The digital modulator of claim 3 wherein
    the auxiliary vector further defines an amplitude as a distance between the endpoint and an origin of the I-Q signal space, and wherein the P-P mapper further comprises
    a clipper coupled to the auxiliary F-V mapper, for setting the amplitude of the auxiliary vector to a maximum value if the amplitude is greater than the maximum value.

7. The digital modulator of claim 6 wherein the maximum value is $$\frac{2}{\sqrt{\pi}}a.$$

8. The digital modulator of claim 1 further comprising a waveform coder for generating the auxiliary and primary frames of binary information in response to a received stream of binary information, the primary frame of binary information associated with the auxiliary frame of binary information.

9. A data communication method comprising the steps of:
    representing a frame of primary information by a primary vector and a frame of auxiliary information by an auxiliary vector utilizing a quadrature amplitude and phase shift keying modulation technique, the primary and auxiliary vectors lying in an In phase and Quadrature (I-Q) signal space;
    defining a first auxiliary point as an endpoint of the auxiliary vector;

mapping the first auxiliary point into a second auxiliary point using a function that maps points within a first area of the signal space into points within a second area of the signal space, the second auxiliary point defining a mapped auxiliary vector;

creating a sum modulation vector by adding the mapped auxiliary vector to the primary vector; and transmitting a carrier modulated in accordance with the sum modulation vector.

10. The data communication method of claim 9 wherein the first area is defined by a disk and the second area is defined by a square area.

11. The data communication method of claim 9 further comprising the step of analyzing a stream of digital information to create the frames of primary information and auxiliary information using a linear predictive coding technique, the primary frame of binary information associated with the auxiliary frame of binary information.

12. The data communication method of claim 10 further comprising the step of defining a plurality of equally spaced primary symbol points in a grid fashion in the I-Q signal space, a distance between two neighboring primary symbol points defined as 2*a, and a primary symbol point defining the primary vector.

13. The method of claim 12 wherein the disk has a radius of $$\frac{2}{\sqrt{\pi}}a$$

and the square area has sides of length 2*a.

14. The method of claim 12 wherein the step of representing the frame of auxiliary information by the auxiliary vector further comprises the steps of:

defining an amplitude for the auxiliary vector; and setting the amplitude equal to a maximum value if the amplitude is greater than the maximum value.

15. The method of claim 14 wherein the maximum value is $$\frac{2}{\sqrt{\pi}}a.$$

16. A digital modulator comprising:

means for generating one of a plurality of primary symbol points in a signal space in response to a primary frame of binary information;

means for generating an auxiliary point in the signal space in response to an auxiliary frame of binary information;

means for generating a mapped auxiliary point based on the auxiliary point and according to a mapping of points within a first region of the signal space into points within a second region of the signal space;

means for generating a sum point by adding the mapped auxiliary point to the primary symbol point; and means for modulating a carrier signal according to the sum point.

17. The modulator of claim 16 wherein the first region is a disk having the same area as the second region being a square, the auxiliary point lying in the first region and the mapped auxiliary point lying in the second region.

* * * * *